(12) United States Patent
Hagner et al.

(10) Patent No.: US 9,399,962 B2
(45) Date of Patent: *Jul. 26, 2016

(54) METHOD FOR DETERMINING AND COMPENSATING ENGINE BLOW-THROUGH AIR

(75) Inventors: Dave G. Hagner, Beverly Hills, MI (US); Mrdjan J. Jankovic, Birmingham, MI (US); De-Shiou Chen, Canton, MI (US); Amey Y. Karnik, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 922 days.

This patent is subject to a terminal disclaimer.

(21) Appl. No.: 13/293,015

(22) Filed: Nov. 9, 2011

(65) Prior Publication Data

US 2013/0111900 A1 May 9, 2013

(51) Int. Cl.

| | |
|---|---|
| *F01N 3/02* | (2006.01) |
| *F01N 3/021* | (2006.01) |
| *F01N 3/023* | (2006.01) |
| *F02B 33/00* | (2006.01) |
| *F02D 23/00* | (2006.01) |
| *F02D 9/08* | (2006.01) |
| *F02M 37/00* | (2006.01) |
| *F02M 69/00* | (2006.01) |
| *F02D 41/00* | (2006.01) |
| *F02D 41/18* | (2006.01) |
| *F02B 25/14* | (2006.01) |
| *F02D 13/02* | (2006.01) |

(Continued)

(52) U.S. Cl.
CPC .......... *F02D 41/0062* (2013.01); *F02B 25/145* (2013.01); *F02B 33/34* (2013.01); *F02B 37/18* (2013.01); *F02D 13/0219* (2013.01); *F02D 13/0261* (2013.01); *F02D 23/02* (2013.01); *F02D 41/0007* (2013.01); *F02D 41/182* (2013.01); *F01N 3/021* (2013.01); *F01N 2430/00* (2013.01); *F01N 2560/025* (2013.01); *F01N 2560/08* (2013.01); *F02B 37/16* (2013.01); *F02B 2075/125* (2013.01); *F02D 41/029* (2013.01); *F02D 2041/001* (2013.01); *F02D 2200/0402* (2013.01); *F02D 2200/0406* (2013.01); *F02D 2200/0411* (2013.01); *Y02T 10/123* (2013.01); *Y02T 10/144* (2013.01); *Y02T 10/18* (2013.01); *Y02T 10/47* (2013.01)

(58) Field of Classification Search
CPC .............. F02D 41/0062; F02D 41/182; F02D 41/0007; F02D 13/0219; F02B 37/18; F02B 25/145
USPC ........................... 60/602; 123/21, 299, 559.1
See application file for complete search history.

(56) References Cited

U.S. PATENT DOCUMENTS

| | | | | |
|---|---|---|---|---|
| 4,685,435 A | * | 8/1987 | Denz et al. ............... | 123/406.47 |
| 5,239,960 A | * | 8/1993 | Sasaki et al. .................. | 123/308 |

(Continued)

*Primary Examiner* — Kenneth Bomberg
*Assistant Examiner* — Brandon Lee
(74) *Attorney, Agent, or Firm* — Julia Voutyras; Alleman Hall McCoy Russell & Tuttle LLP

(57) ABSTRACT

A method for determining cylinder blow-through air via engine volumetric efficiency is disclosed. In one example, the method provides a way to adjust cylinder blow-through to promote and control a reaction in an exhaust after treatment device. The approach may simplify cylinder blow-through calculations and improve engine emissions via providing improved control of constituents reaching an exhaust after treatment device.

18 Claims, 3 Drawing Sheets

(51) Int. Cl.
  *F02D 23/02*   (2006.01)
  *F02B 33/34*   (2006.01)
  *F02B 37/18*   (2006.01)
  *F02D 41/02*   (2006.01)
  *F02B 75/12*   (2006.01)
  *F02B 37/16*   (2006.01)

(56) References Cited

U.S. PATENT DOCUMENTS

| | | | |
|---|---|---|---|
| 6,904,881 B2 * | 6/2005 | Hirowatari et al. | 123/90.15 |
| 7,021,298 B2 * | 4/2006 | Nakazawa et al. | 123/568.14 |
| 7,275,516 B1 | 10/2007 | Cunningham et al. | |
| 7,392,774 B2 * | 7/2008 | Magner et al. | 123/90.17 |
| 8,352,158 B2 * | 1/2013 | Hagner et al. | 701/103 |
| 8,731,802 B2 * | 5/2014 | Hagner et al. | 701/103 |
| 2008/0077304 A1 * | 3/2008 | Suzuki et al. | 701/102 |
| 2009/0018751 A1 * | 1/2009 | Buckland et al. | 701/103 |
| 2009/0024300 A1 * | 1/2009 | Turin et al. | 701/103 |
| 2009/0070014 A1 | 3/2009 | Miyashita | |
| 2009/0078242 A1 * | 3/2009 | Aliakarzadeh et al. | 123/673 |
| 2009/0308070 A1 * | 12/2009 | Alger et al. | 60/602 |
| 2010/0263639 A1 * | 10/2010 | Uhrich et al. | 123/564 |
| 2010/0312451 A1 * | 12/2010 | Karnik et al. | 701/102 |
| 2011/0209685 A1 * | 9/2011 | Shane et al. | 123/299 |
| 2011/0225967 A1 * | 9/2011 | Karnik et al. | 60/602 |
| 2012/0159933 A1 * | 6/2012 | Karnik et al. | 60/274 |

* cited by examiner

METHOD FOR DETERMINING AND COMPENSATING ENGINE BLOW-THROUGH AIR

BACKGROUND/SUMMARY

Turbocharged and supercharged engines pressurize air entering an engine so that engine power can be increased. The pressurized air provides for an increased cylinder air charge during a cycle of the engine as compared to a naturally aspirated engine. Further, the cylinder fuel charge can be increased as the cylinder air charge is increased to increase the amount of energy produced when the fuel is combusted with the air during a cycle of the cylinder. However, during periods of valve overlap where both intake and exhaust valves of a cylinder are simultaneously open, it is possible for air to pass directly from the engine intake manifold to the engine exhaust manifold without participating in combustion within a cylinder. Air passing directly from the intake manifold to the exhaust manifold without participating in combustion may be referred to as blow-through.

Fresh air or blow-through passing through the intake manifold to the exhaust manifold may have beneficial as well as undesirable characteristics. For example, blow-through can evacuate internal exhaust residuals from engine cylinders so that the fresh charge in the cylinder increases, thereby increasing engine power output. However, blow-through may also upset a delicate balance between oxygen, hydrocarbons, and CO in a catalyst in the engine exhaust path. If blow-through provides excess oxygen to the catalyst, it may be possible for NOx conversion efficiency to decrease.

One way to mitigate engine emissions that may result from blow-through is to account for blow-through gases. In one example, engine air-fuel ratio may be richened so that on average a stoichiometric air-fuel ratio mixture passes through engine cylinders. For example, for a direct injection engine where fuel is injected after exhaust valve closing, fresh air can flow from the intake manifold to the exhaust manifold during intake and exhaust overlap. Further, an increased amount of fuel may be supplied to an engine cylinder so that the cylinder combusts a rich air-fuel mixture. The contents of the cylinder may be subsequently combined with the blow-through air stored in the catalyst to provide near stoichiometric ratios of gases to the catalyst so that the catalyst can efficiently oxidize and reduce undesirable exhaust gas constituents. However, it is difficult to keep the catalyst balanced and adjust air-fuel ratio of a cylinder without knowing the amount of blow-through for speed-density control systems.

The inventors herein have recognized the above-mentioned disadvantages and have developed a method for accounting for cylinder blow-through of an engine, comprising: adjusting an engine actuator controlling supply of a constituent for combustion to a cylinder of the engine in response to a difference between a total cylinder air mass flow curve and a volumetric efficiency curve.

A mass of oxygen that reaches an exhaust after treatment device resulting from cylinder blow-through may be determined from two curves that characterize engine breathing. In particular, cylinder blow-through may be determined as a difference between a first curve that represents volumetric efficiency for a theoretical maximum cylinder air charge and second curve that represents total air flow through the cylinder. Both curves may be described according to slopes of lines so that cylinder blow-through may be determined without having to perform a significant number of calculations and without having to determine a cylinder air-fuel ratio.

In another example, the amount of blow-through can be adjusted to increase engine output and to provide a desired amount of oxygen to the exhaust system to promote regeneration of an exhaust gas emissions device. For example, blow-through may be used during regeneration of a particulate filter to oxidize stored carbonaceous soot. The amount of blow though can affect the temperature rise of the oxidizing carbonaceous shoot during regeneration. Therefore, it may be desirable to determine the amount of blow though so that a desired level of blow-though may be provided to the emissions device without supplying excess blow-through.

The present description may provide several advantages. In particular, the approach can reduce vehicle emissions by providing an accurate blow-through estimate so that an amount of air reaching an exhaust gas after treatment device may be determined. Further, an engine actuator may be adjusted so as to control the amount of blow-through supplied to the exhaust gas after treatment device. Further still, the method provides for determining an engine operating condition where blow-through begins so that blow-though can be controlled during conditions where increased engine power is desired or when exhaust gas constituents entering a catalyst may be balanced so as to improve conversion efficiency of engine exhaust emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3 shows a high level flowchart of a method for determining cylinder blow-through and making adjustments to compensate for cylinder blow-through.

DETAILED DESCRIPTION

Figure 1:
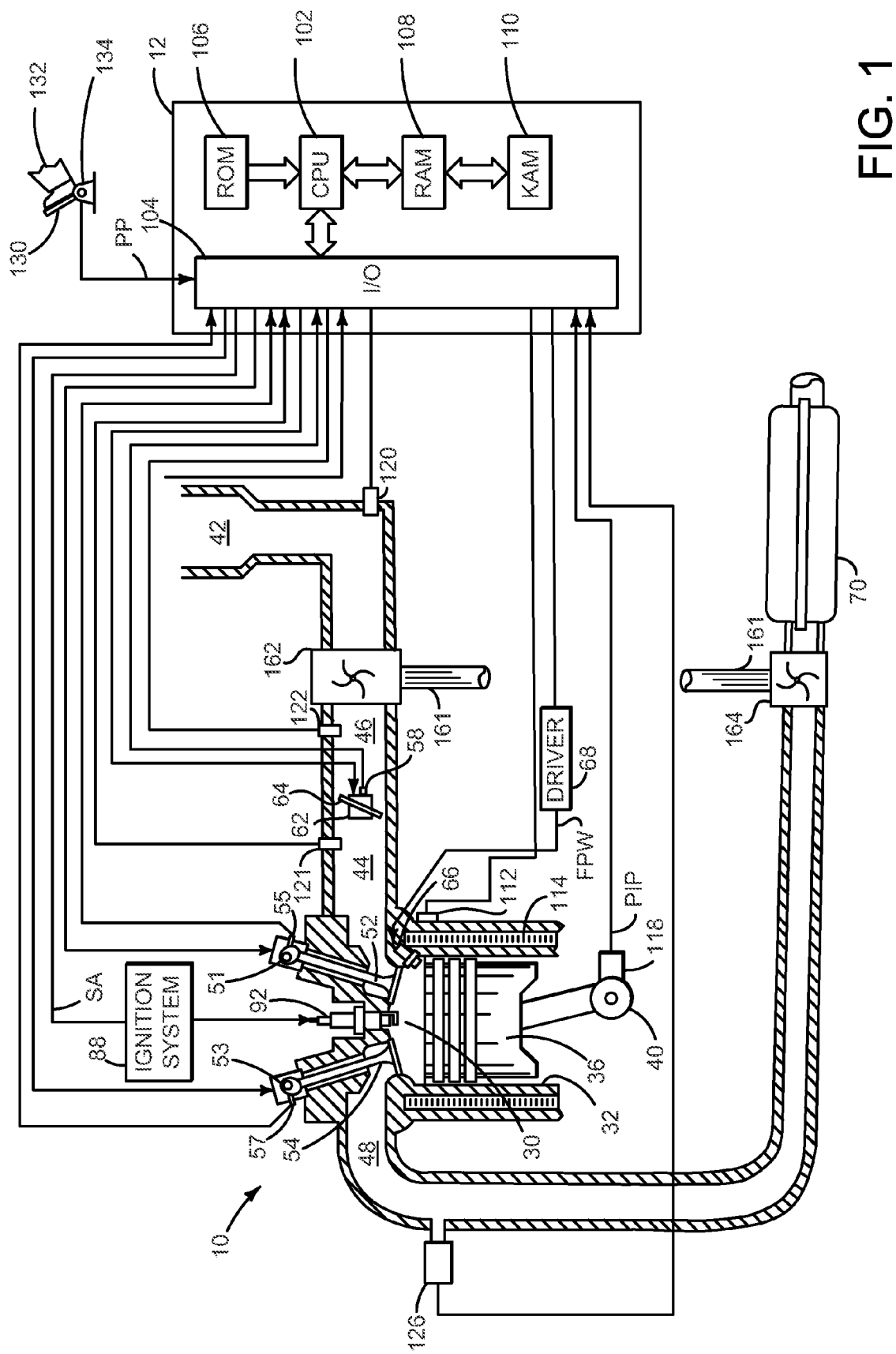
FIG. 1 shows a schematic depiction of an engine.
Figure 2:
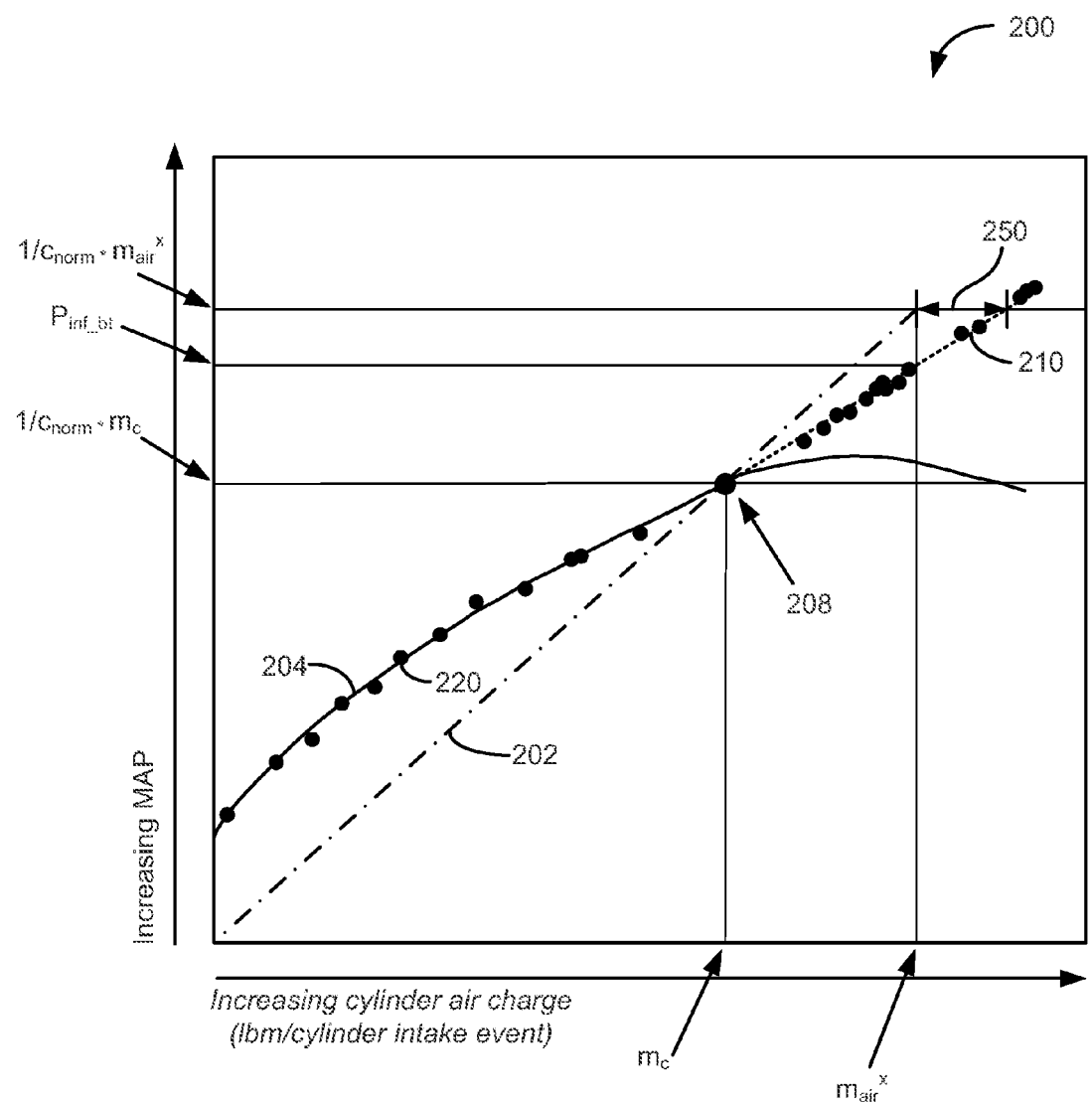
FIG. 2 shows a volumetric efficiency characterization of cylinder air charge.
Figure 3:
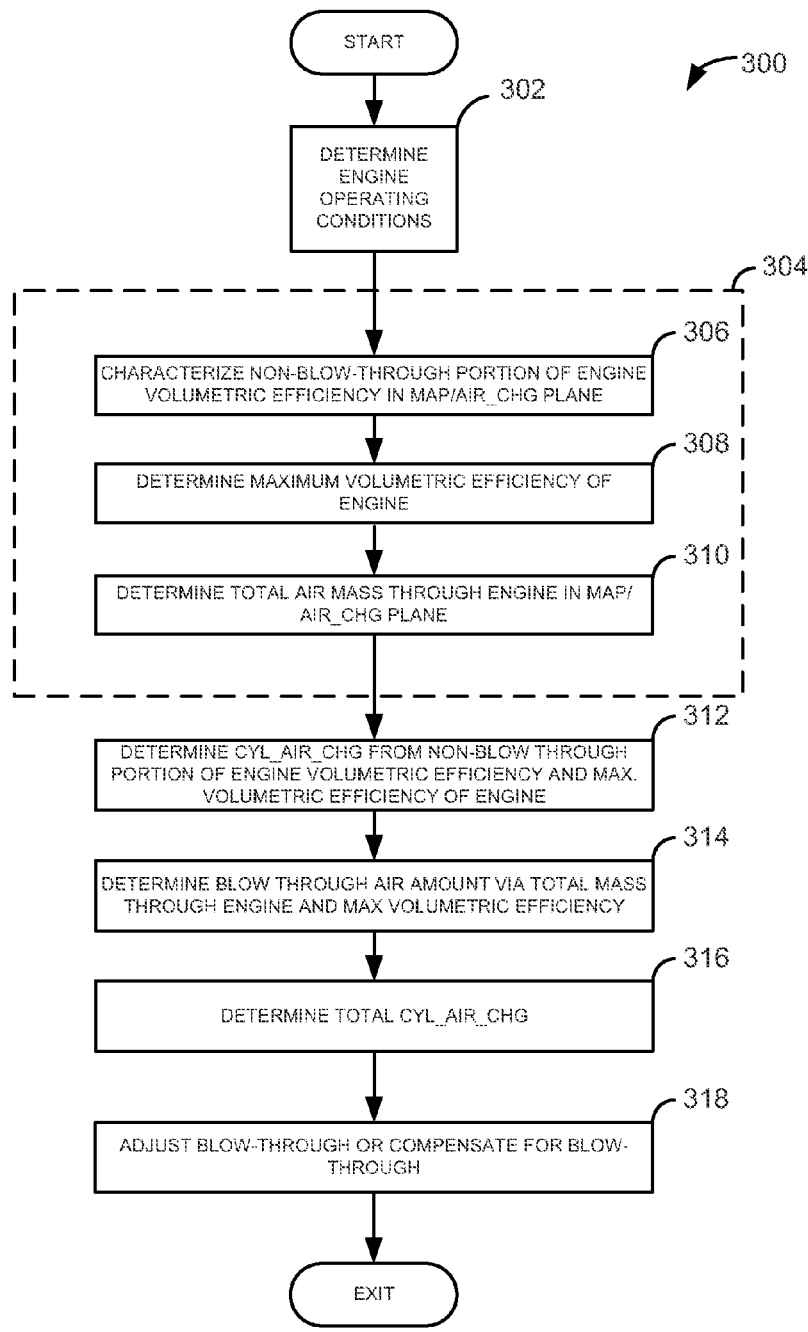

The present description is directed to determining blow-through of a cylinder of an engine. FIG. 1 shows one example system for determining blow-through of a cylinder. The system includes a turbocharger operated with a spark ignited mixture of air and gasoline, alcohol, or a mixture of gasoline and alcohol. However, in other examples the engine may be a compression ignition engine, such as a diesel engine. FIG. 2 shows a simulated example plot of curves that are the basis for determining cylinder blow-through. FIG. 3 shows an example method for determining and adjusting cylinder blow-through.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Exhaust gases spin turbocharger turbine 164 which is coupled to turbocharger compressor 162 via shaft 161. Compressor 162 draws air from air intake 42 to supply boost chamber 46. Thus, air pressure in intake manifold 44 may be elevated to a pressure greater than atmospheric pressure. Consequently, engine 10 may output more power than a normally aspirated engine. In other examples, compressor 162 may be a supercharger driven by the engine where turbine 164 is omitted.

Distributorless ignition system 88 provides an ignition spark to combustion chamber 30 via spark plug 92 in response to controller 12. Ignition system 88 may provide a single or multiple sparks to each cylinder during each cylinder cycle. Further, the timing of spark provided via ignition system 88 may be advanced or retarded relative to crankshaft timing in response to engine operating conditions.

Universal Exhaust Gas Oxygen (UEGO) sensor 126 is shown coupled to exhaust manifold 48 upstream of exhaust gas after treatment device 70. Alternatively, a two-state exhaust gas oxygen sensor may be substituted for UEGO sensor 126. In some examples, exhaust gas after treatment device 70 is a particulate filter and/or a three-way catalyst. In other examples, exhaust gas after treatment device 70 is solely a three-way catalyst.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92 resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a simulated plot of volumetric efficiency characterization of cylinder air charge is shown. The X axis of plot 200 represents air mass charge of a cylinder per cylinder intake event or cylinder cycle. Air mass charge increases from the left side of the plot to the right side of the plot. The Y axis of plot 200 represents engine intake manifold absolute pressure (MAP) and MAP increase from the bottom of the origin of the plot in a direction of the Y axis.

Curve 202 represents the theoretical maximum air charge that the cylinder can hold at a given pressure at intake valve closing (IVC). Thus, the cylinder mass charge increases linearly as the cylinder pressure increases. In one example, the maximum air charge that the cylinder can hold may be characterized as a slope of a line where the slope is described as:

$$\text{Slope} = \frac{1}{(1 - r_{pb})c_{norm}}$$

where variable $c_{norm}$ accounts for physical properties of air, intake manifold temperature, and cylinder displacement. Variable $r_{pb}$ is an effective pushback ratio characterizing a portion of a cylinder mixture that may be pushed into the engine intake manifold from the cylinder as the piston moves in a direction toward the cylinder head while the intake valve is open. The pushback ratio may be determined as the greater of a constant multiplied by the physical ratio of cylinder volume displaced by the piston moving from the bottom dead center (BDC) to the intake valve closing (IVC) point, to the total cylinder displacement volume of the cylinder and the pushback ratio computed from engine mapping as:

$$1 - \frac{1}{c_{norm} * \text{air\_slope}}$$

where air_slope is the least-squares linear fit of the manifold pressure vs. trapped air charge data excluding blow-through data points.

Curve 204 represents a conventional non-blow-through (e.g., conditions where blow-through is not present) volumetric regression curve in which both x and y axes have been scaled by ExhMAP/ExhMAP_nom. Where ExhMAP is exhaust manifold absolute pressure and where ExhMAP_nom is a nominal exhaust manifold absolute pressure (e.g. at sea level). Instead of the cycle average exhaust manifold absolute pressure, an average over the valve-overlap window, or some other related quantity, could be used for scaling. In engines having variable cam timing, curve 204 may be regressed from data points such as 220 into a quadratic curve.

Intersection 208 represents the point where the conventional non-blow-through curve 204 and the theoretical maximum air charge curve 202 intersect. Thus, when MAP is greater than the level of MAP where intersection 208 takes place, air blows through the cylinder. In some examples, the engine may be operated at a MAP up to where intersection 208 occurs but not higher so that cylinder blow-through may be prevented. In other examples, when MAP is higher than MAP where intersection 208 takes place, blow-through may be determined so that an actuator may compensate for the amount of blow-through.

Curve 210 represents a total amount of air flowing through the cylinder (e.g. a total cylinder air mass flow curve) during the blow through operation. The total amount of air includes air in the cylinder as well as blow-through air. In one example, curve 210 may be described by a slope that extends from intersection 208. The slope may be found via regressing empirically determined data. For example, a least-squares or other regression may be the basis for determining the equation of a line describing total air flow through a cylinder during blow-through conditions.

Given the cylinder air charge $m_{air}^{cyl}$, the inferred pressure in the intake manifold as shown in FIG. 2 may be described as:

$$m_{air}^x(k) = \frac{m_{air}^{cyl}(k)}{\text{vol\_eff\_cor}(ACT, ECT)} * \frac{30[in-Hg]}{P_{exh}(k)}$$

if $m_{air}^x(k) > m_c(k)$ $P_{inf}(k) =$ $$\frac{P_{exh}(k)}{30[in-Hg]} \max\left\{\frac{1}{c_{norm}} * m_c(k), \left[\frac{1}{c_{norm}} * m_c(k) + slp * (m_{air}^x(k) - m_c(k))\right]\right\}$$

else $P_{inf}(k) =$ $$\frac{P_{exh}(k)}{30[in-Hg]}(\text{air\_offset} + \text{air\_slope} \times m_{air}^x(k) + \text{air\_quad} \times m_{air}^x(k)^2)$$

end

Where k is a $k^{th}$ sample interval, $m_{air}^{cyl}(k)$ is mass of air in cylinder, $m_c(k)$ is mass of air in cylinder at the point blow-through begins (e.g., 208), slp is the slope of the line describing total amount of air flowing through the cylinder (e.g., 210), $P_{exh}(k)$ is exhaust pressure, vol_eff_cor (ACT, ECT) is a volumetric correction for air charge temperature ACT and engine temperature ECT, and $m_{air}^x$ is the scaled cylinder air charge. The parameters air_offset, air_slope, and air_quad represent the conventional non-blow-through curve 204 and can be calibrated by a least squares fit of the engine data.

To compute the trapped cylinder air charge and the mass of blow-through air for a given manifold absolute pressure MAP, a recursive calculation can be used. At time k, the cylinder air charge is computed from the current measurement of MAP and one of the previously computed estimates of the mass of dilution:

$$m_{air}^{cyl}(k) = (1 - r_{pb}) * c_{norm} * \text{MAP}(k) - m_d(k-1)$$

where $m_d$ is the estimated mass of dilution in the cylinder "l" events before (l is equal to 1 for an I4 engine, 1.5 for a V6, and 2 for a V8). Next, the inferred manifold absolute pressure is computed as above while assuming operation in the non-blow-through condition:

$$m_{air}^x(k) = \frac{m_{air}^{cyl}(k)}{\text{vol\_eff\_cor}(ACT, ECT)} * \frac{30[in-Hg]}{P_{exh}(k)}$$

$P_{inf}(k) =$ $$\frac{P_{exh}(k)}{30[in-Hg]}(\text{air\_offset} + \text{air\_slope} \times m_{air}^x(k) + \text{air\_quad} \times m_{air}^x(k)^2)$$

The current estimate of the mass of dilution in the cylinder is:

$$m_d(k) = \max\{0, c_{norm} * (1 - r_{pb}) * P_{inf}(k) - m_{air}^{cyl}(k)\}$$

If the computed mass of dilution is 0, the air charge computed above is higher than the critical value $m_c$, which means the engine is operating in blow-through. In this case the in-cylinder air charge is clipped to:

$$m_{air}^{cyl}(k) = (1 - r_{pb}) * c_{norm} * \text{MAP}(k)$$

The amount or mass of blow-through may be determined for a desired or given MAP via taking a difference between curve 210 and curve 202 as represented by the distance 250. Thus, blow-through may be determined according to volumetric efficiency characterization of an engine:

$$m_{air}^{bt}(k) = \max\left\{0, \frac{(1/c_{norm} - slp_{bt}) \times [m_{air}^x(k) - m_c(k)]}{slp_{bt}}\right\} \times$$

$$\frac{P_{exh}(k)}{30[inHg]} \times \sqrt{\frac{560}{ACT + 460}}$$

Finally the total amount of air is equal to the sum of the in-cylinder air-charge $m_{air}^{cyl}$ and the mass of blow through $m_{air}^{bt}$.

Referring now to FIG. 3, a high level flowchart of a method for determining cylinder blow-through and compensating for cylinder blow-through is shown. The method of FIG. 3 is executable via instructions of a controller as shown in the system of FIG. 1.

At 302, method 300 determines engine operating conditions. Engine operating conditions may include but are not limited to engine temperature, ambient air temperature, MAP, engine air flow, throttle position, engine torque demand, and cam positions. Method 300 proceeds to 304 after engine operating conditions are determined.

At 304, method 300 characterizes a non-blow-through curve of an engine in a MAP/Air charge plane as shown via curve 204 of FIG. 2. In one example, values of MAP and cylinder air charge are determined at steady state (e.g., steady engine speed and torque demand) engine operating conditions. An equation of a curve is identified from the MAP and cylinder air charge data points via a least-squares or other type of regression. The curve may also be scaled via a ratio of exhaust pressure versus nominal exhaust pressure. The equation of the curve may be stored in controller memory such that cylinder air charge or MAP may be determined when the equation of the curve is indexed or multiplied by a present value of MAP or cylinder air charge. Method 300 proceeds to 308 after non-blow-through volumetric efficiency is characterized.

At 308, method 300 determines a maximum volumetric efficiency of the cylinder or maximum air charge that the cylinder can hold at a give pressure. In one example, the maximum volumetric efficiency is determined at IVC. The maximum air charge that the cylinder can hold as described above may be characterized as a slope of a line where the slope is described as:

$$\text{Slope} = \frac{1}{(1 - r_{pb})c_{norm}}$$

The slope may be stored in controller memory and indexed at a later time to determine MAP or cylinder air charge. For example, when the slope is multiplied by a desired cylinder air charge, an intake manifold pressure that provides the desired cylinder air charge is output. Similarly, cylinder air charge may be determined via multiplying 1/slope by MAP to determine cylinder air charge. Method 300 proceeds to 310 after maximum volumetric efficiency of the engine is determined.

At 310, method 300 determines a total mass of air through the engine during blow-through conditions. In one example as described above, the total amount of air passing through an engine cylinder and MAP may be empirically determined via monitoring MAP and mass air flow through an engine after the blow-through point 208 is determined. The blow-through point 208 may be determined as the intersection of the non-blow-through volumetric efficiency curve and the maximum volumetric efficiency curves as is described above. The blow-through point may be determined and stored in memory so that engine blow-through may be easily determined during engine operation, or it may be computed on-line while the engine is running. Method 300 proceeds to 312 after the total mass of air through the engine is determined. One possible way to calculate trapped cylinder air amount and the blow-through air mass is described above.

At 312, cylinder air charge is determined. In one example, cylinder air charge may be determined via selecting the lower value of cylinder air charge from the non-blow-through curve (e.g., curve 204 of FIG. 2) and the cylinder air charge from the theoretical maximum air charge that the cylinder can hold (e.g., curve 202 of FIG. 2) at a given MAP. Alternatively, a MAP where a desired cylinder air charge is provided may be determined via selecting the higher value of MAP from the non-blow-through curve and the theoretical maximum air charge curve. In this way, depending on the sensor set available and the objectives, either MAP or cylinder air charge may be determined. Method 300 proceeds to 314 after cylinder air charge is determined.

At 314, method 300 determines blow-through via the total mass flow through the cylinder and the maximum volumetric efficiency curves. In one example, the flow at the maximum volumetric efficiency of the cylinder is subtracted from the total mass flow through the cylinder to provide an amount of cylinder blow-through. An amount of engine blow-through may be determined via summing blow-through amounts of each engine cylinder over one or more engine cycles. In one example, as shown in FIG. 2, the blow-through may be visually represented as shown at 250 of FIG. 2. Method 300 proceeds to 316 after blow-through is determined.

At 316, total cylinder air charge may be determined via adding cylinder air charge from 312 and blow-through from 314. Alternatively, total cylinder air charge may be determined via simply indexing the total air mass curve as described at 310 and FIG. 2. Method 300 proceeds to 318 after the total cylinder air charge is determined.

At 318, method 300 adjusts engine operation based on cylinder air charge, blow-through, and total cylinder air flow. Spark timing and air-fuel ratio for a cylinder may be determined via indexing a spark map via the present cylinder air charge. For example, if cylinder air charge is X lbm/stroke engine spark may be determined to be 30 crankshaft degrees before top dead center compression stroke. Further, injector and cam timing may be adjusted based on cylinder air charge via similarly indexing tables of empirically determined injector timings and cam timing using the present cylinder air charge. Further, in some examples, MAP, throttle position, compressor or supercharger controls and/or variable valve timing controls may be adjusted to provide a desired cylinder air charge via indexing tables of empirically determined values that are indexed via cylinder air charge.

Injector timing and pulse width may also be adjusted for blow-through. In one example, an injected fuel amount can be adjusted proportionately with blow-through via adjusting fuel injector pulse width. For example, if blow through is X lbm/event a fuel pulse width may be adjusted so that X*1/14.6 lbm/event of fuel is added to each cylinder during a cylinder cycle so as to balance air and fuel reaching the catalyst.

In another example, a position of a throttle can be adjusted based on the pressure drop across the throttle and the desired cylinder air flow rate to provide a MAP that provides the cylinder flow rate.

In another example, throttle position and turbocharger vane or waste gate position can be adjusted to adjust boost and MAP so that a desired amount of blow-through is provided. For example, if a predetermined amount of blow-through is desired, the predetermined amount of blow-through may be determined via subtracting the maximum volumetric efficiency curve from the total amount of air flowing through the cylinder at MAP values greater than a point where blow-through begins (e.g., 208 of FIG. 2). Engine boost may be increased along with adjusting throttle position such that the lowest value of MAP where the desired level of blow-through is present is provided. In one example, the waste gate may be closed to increase boost pressure and the throttle opened to increase MAP to a level where a desired amount of blow-through is present. Alternatively, if MAP is higher than where a desired blow-through is provided (e.g., blow-through is greater than is desired), then the throttle may be closed and the boost reduced via opening a turbocharger waste gate. In some cases, the amount of blow-through can be lowered by opening the compressor bypass valve or increased by engaging a supercharger, if the engine is so equipped. Further, in some examples intake and exhaust valve opening time overlap may be increased to provide a desired level of blow-through. Thus, blow-through can be adjusted to increase or decrease an amount of energy, oxygen, or other exhaust gas constituents supplied to an emissions device in an exhaust system.

Some engine actuators may also be adjusted based on the total cylinder flow. For example, the amount of fuel injected to the engine may be adjusted based on the total flow of air through engine cylinders. Thus, different engine actuators may be adjusted for cylinder air charge, blow-through, and total cylinder flow.

As will be appreciated by one of ordinary skill in the art, the method described in FIG. 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method of compensating engine cylinder blow-through via a controller, comprising:
sensing via a sensor;
receiving an output of the sensor in to the controller;
estimating a difference between a total cylinder air mass flow curve and a maximum volumetric efficiency curve via the controller; and
adjusting an engine actuator operatively connected to the controller and controlling supply of a combustion constituent to a cylinder in response to the estimated difference.

2. The method of claim 1, where the total cylinder air mass flow curve characterizes mass flow through the cylinder where air mass charge of the cylinder is greater than at a point where the maximum volumetric efficiency curve and a non-blow-through volumetric efficiency curve intersect.

3. The method of claim 1, where the engine actuator is a fuel injector, and where the maximum volumetric efficiency curve has a slope based on an effective pushback ratio.

4. The method of claim 1, where the engine actuator is a turbocharger vane.

5. The method of claim 1, where the engine actuator is an air inlet throttle.

6. The method of claim 1, where a difference between a total cylinder air mass regression curve and the maximum volumetric efficiency curve represents an amount of blow-through of the cylinder.

7. The method of claim 1, where the constituent for combustion is air or fuel.

8. A method of compensating engine cylinder blow-through via a controller, comprising:
sensing via a sensor;
receiving an output of the sensor in to the controller;
estimating a difference between a total cylinder air mass regression curve and a volumetric efficiency curve related to engine volumetric efficiency via the controller; and
adjusting an amount of cylinder air blow-through in response to the estimated difference, to provide a desired exhaust gas constituent mixture to an exhaust after treatment device, via an actuator operatively coupled to the controller.

9. The method of claim 8, where the amount of blow-through is adjusted via adjusting a turbocharger, and where the total cylinder air mass regression curve has a slope based on an effective pushback ratio.

10. The method of claim 8, where the amount of cylinder air blow-through is adjusted via adjusting manifold absolute pressure (MAP), via at least one of opening or closing a throttle and adjusting variable valve timing.

11. The method of claim 8, further comprising increasing an amount of fuel injected to the engine as cylinder blow-through is increased.

12. The method of claim 11, where the exhaust after treatment device is a particulate filter, and where the engine is a spark ignited engine.

13. A engine operating system, comprising:
an engine;
a turbocharger coupled to the engine;
an exhaust system coupled to the turbocharger;
an actuator;
an exhaust gas after treatment device positioned along a length of the exhaust system; and
a controller, operatively connected to the actuator, including instructions stored in non-transitory memory and executable by a processor of the controller, the controller configured to:
adjust the actuator to control supply of a constituent for combustion to a cylinder of the engine in response to a difference between a total cylinder air mass flow curve and a volumetric efficiency curve, and
adjust cylinder air charge in response to a lower cylinder air charge amount based on determining the volumetric efficiency curve or a non-blow-through volumetric efficiency curve.

14. The engine operating system of claim 13 where the volumetric efficiency curve is a maximum cylinder air charge curve.

15. The engine operating system of claim 14, further comprising additional instructions to determine an intersection of the volumetric efficiency curve and the non-blow-through volumetric efficiency curve.

16. The engine operating system of claim 15, where the total cylinder air mass flow curve begins at the intersection and extends to higher cylinder air flows.

17. The engine operating system of claim 13, where the difference between the total cylinder air mass flow curve and the volumetric efficiency curve represents an amount of cylinder blow-through.

18. The engine operating system of claim 17, further comprising additional instructions to adjust the amount of cylinder blow-through during regeneration of the exhaust after treatment device.

* * * * *